United States Patent [19]

Thomas, Jr.

[11] Patent Number: 5,034,074
[45] Date of Patent: Jul. 23, 1991

[54] METHOD FOR FORMATION OF A PEELABLE LID

[75] Inventor: John S. Thomas, Jr., Williamsburg, Va.

[73] Assignee: Rampart Packaging Inc., Williamsburg, Va.

[21] Appl. No.: 471,330

[22] Filed: Jan. 29, 1990

[51] Int. Cl.$^5$ .......................... B65B 7/28; B65D 45/32
[52] U.S. Cl. ...................... 156/69; 220/319; 220/359; 53/485; 53/478
[58] Field of Search .................. 156/69; 220/319, 359; 53/485, 478; 229/5.7

[56] References Cited

U.S. PATENT DOCUMENTS

| | | | |
|---|---|---|---|
| 3,491,935 | 1/1970 | Trotter et al. | 229/3.5 |
| 3,679,509 | 12/1969 | Fielibert | 156/182 |
| 4,171,236 | 10/1979 | Winchell et al. | 156/69 |
| 4,350,263 | 9/1982 | Hoffman | 220/359 |
| 4,496,046 | 1/1985 | Stone et al. | 206/219 |
| 4,519,499 | 5/1985 | Stone et al. | 206/219 |
| 4,589,568 | 5/1986 | Ito et al. | 220/359 |
| 4,689,099 | 8/1987 | Ito et al. | 156/69 |
| 4,757,914 | 7/1988 | Roth et al. | 220/359 |
| 4,775,076 | 10/1988 | Horvath | 220/359 |
| 4,810,541 | 3/1989 | Newman et al. | 428/36.7 |
| 4,830,215 | 5/1989 | Rebischung | 220/359 |
| 4,905,838 | 3/1990 | Suzuki et al. | 206/631 |
| 4,913,307 | 4/1990 | Takata et al. | 220/359 X |
| 4,961,513 | 10/1990 | Gossedge et al. | 53/373 |

FOREIGN PATENT DOCUMENTS 2213125A 8/1989 United Kingdom .

Primary Examiner—Michael W. Ball
Assistant Examiner—Daniel J. Stemmer

[57] ABSTRACT

A method for joining a lid to a container includes the formation of interlocking waves of material at the location where the lid joins the container. The interlocking waves are geometrically aligned relative to the interior of the container so as to maximize the burst strength of the container and minimize the peel strength of the lid from the container.

6 Claims, 3 Drawing Sheets

«5,034,074»

METHOD FOR FORMATION OF A PEELABLE LID

RELATED APPLICATION

This application is related to application Ser. No. 07/471,329, filed Jan. 29, 1990, entitled "Apparatus for a Peelable Lid", inventor John S. Thomas, Jr.

BACKGROUND OF THE INVENTION

1. Field of the Invention

This invention relates to a method of forming a peelable seal for containers. This invention also relates to the shape of the seal structure used to seal a lid to a container.

2. Discussion of the Prior Art

As discussed in U.S. Pat. No. 3,491,935 packages of thermoplastic materials have been used extensively in various industries for dispensing a wide variety of both flowable and non-flowable materials. These packages consist of containers that have been sealed in various ways, and recently there has been a great need for a container sealed with thin-wall sealing material that is either punctured or removed by the consumer to access the contents of the sealed package.

The '935 patent uses a differential method of forming a peelable seal for the containers in which the two thermoplastic materials selected to form the lid and the container have different softening points. These materials are heated while they are in contact with one another so that the first material fuses and secures itself to the second material, and thereby forms the desired peelable seal without fusing the second material (lines 15-22 of col. 2).

In the sealing operation of the '935 patent, the heat flows through the closure material from a heated sealing die which also extrudes a portion of the closure material from beneath the die, so as to form a bead on the flange of the container. It should be noted that the beads formed in this reference are not on the inner rim of the flange.

U.S. Pat. No. 4,519,499 issued to Stone et al on May 28, 1985, (as well as U.S. Pat. No. 4,496,046, same inventor and assignee), discloses a container having a selectively openable seal line and peelable barrier means. The container is made of two sheets which are secured to each other by a seal that includes a bead area of increased thickness at the break end of it, FIGS. 1, 2 and 3; lines 46-48 of col. 2). The sealing die used for sealing the two sheets together consist of a die head and a mirror image die head. Each of them has a convex projection and a bevel surface formed 5 degrees from horizontal FIGS. 7, 8, 9, and 10, lines 15-32 of col. 6). This reference relates to the use of a sealing die having a beveled surface and the formation of beads. However, it does not relate to the formation of beads on the inner rim of a container.

U.S. Pat. No. 3,679,509 issued to Fielibert on July 25, 1972 relates to a process for sealing laminated materials. This reference uses a V-shaped bar as its sealing head in which the obtuse angle ranges form 150°-170° (lines 14-21 of col. 2).

U.S. Pat. No. 4,171,236 discloses a method for forming a fractionable seal of the type wherein a plastic cup-shaped closure is hermetically sealed to a plastic planar surface, such as the neck of pharmaceutical solution containers. The seal is formed with the closure by forcing a die heated above the melting point of the plastic materials into the desired planer surface. Both the planar surface and the closure adjacent thereto become molten and the surface material is displaced to form a fused seal transverse to the surface. Due to the design of the die, a frangible section is formed in the vertical sidewall of the depression. This reference also does not disclose any formation of beads on the inside rim of a container flange.

In food packaging, the area of the invention, is important that the lid remain fixed to the container during distribution of the closed container via various transportation routes to the eventual consumer. In an attempt to standardize the survivability determination of sealed containers, the U.S.D.A. has defined the "Restrained Burst Test" as a means of measuring this ability to maintain package integrity. The restrained burst test involves pressurizing the inside of the subject container with compressed air. The seal container must be able to maintain +5 psig between the inside and outside of the container for at least 60 seconds.

Unfortunately, when one increases the survivability of the package by increasing the width and strength of the seal area between the container and the lid, (such as to withstand a 10 psig pressure differential), the peel strength in the prior art devices also increases in a linear manner such that it becomes very hard for the purchaser of the packaged food container to open the lid. The designer of the food container is therefore faced with a Hobson's choice, wherein a container that may survive the transportation phase will not be openable by the subsequent purchaser, or where an "easy open" container will not survive the transportation process. Increasing the burst strength of a container causes an undesirable increase in the peel strength required to open the container.

Most food packers require a minimum of 10 psi burst pressure and would like 15 psi. With conventional lid sealing, 15 psi burst pressure requires a material that has a peel strength of 10.75 lbs/in. This is extremely difficult to peel.

A method of sealing a lid to a container therefore needs to be developed wherein a high burst pressure for the container does not unduly hamper the consumer from peeling the lid from the container.

SUMMARY OF THE INVENTION

In the preferred method of the present invention, a container lid is heated along the desired area to be sealed, the area being placed in close and intimate contact with a portion of a container flange. The lid material typically has a lower melting temperature than the container flange material. Pressure is applied to the now melted lid material by a seal head so as to flow a portion of the now melted lid material towards the inside rim of the container, where the lid meets the container flange. A preliminary wave of molten lid material is thereby formed about the inside rim of the container.

Pressure on the container flange transmitted through the lid by the seal head causes a portion of the flange material to also flow towards the inside rim of the container. The pressures, temperatures, and timing of the pressure and temperature application is selected such that a wave of flange material penetrates the molten wave of the lid material. The flange material wave effectively divides a portion of the preliminary lid material wave such that a portion of the lid material wave is moved beneath the container wave.

These two waves are sized to interlock with one another and therefore form a sealed area about the inside rim of the container that is resistant to the higher burst pressures encountered, for example, in a retort process. The waves are positioned in an overlapping manner generally normal to the applied internal pressures generated within the sealed container. It should be noted that the seal layer on the lid must be sufficiently thick for the wave to form. Seal layers less than 0.5 mil do not work. Seal layers 2 mil and greater work well.

The peel strength, however, required to remove the lid from the container remarkably remains within acceptable limits since the peel forces are applied parallel to the interlocked wave joint. Even though the burst strength increases significantly, the peel strength, due to the geometrical alignment of the waves according to the teachings of the invention, remains well within acceptable limits.

More specifically, the invention relates to a method of heating a first material forming a portion of a lid along an area to be sealed, the area placed in close and intimate contact with a second material forming a portion of the container. The first material will typically have a lower melting temperature than the second material, the heating being carried out for a time and temperature sufficient to melt a portion of both materials. Pressure is applied to the first material and the second material along the area to be sealed to form interlocking waves of the first material and second material. The first material will have sufficient thickness to facilitate creation of the interlocking wave.

The operative engagement of the lid to the container may be of sufficient closeness so as to hermetically seal the lid to the container.

It should be noted that the lid and/or container material may be heated by a conduction seal head, or by other means well known to the art such as by radio frequency heating.

It is therefore a feature of the present invention to align two interlocking waves of material at the junction of a lid to a container so as to maximize burst strength and minimize peel strength.

It is an object of the invention to fabricate a sealing structure for a container/lid system having high burst strength and low peel strength.

These and other features, objects and advantages of the present invention will become apparent from the following detailed description wherein reference is made to the Figures in the accompanying drawings.

IN THE DRAWINGS

DESCRIPTION OF THE PREFERRED EMBODIMENT

Figure 1:
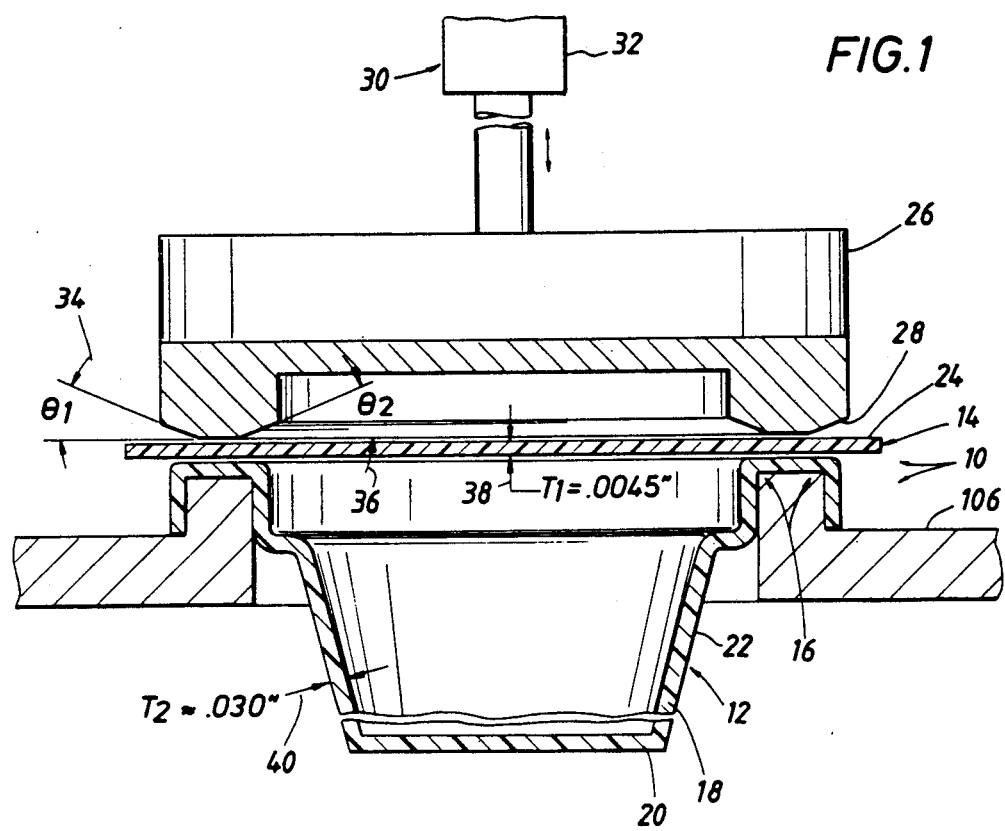
FIG. 1 shows a schematic representation in a side view in partial cross section of a lid positioned over the flange of a container, prior to engagement of a seal head with the upper surface of the lid.

Referring now to FIG. 1 the food container article 10 of the present invention is shown having a container 12 and lid 14. Container 12 can be seen to include flange 16 formed about the upper periphery of the container wall 18 which typically extends upward from a base 20 of the container. The flange 16 is formed from a second sheet 22 incorporating a second material either singly or in the form of a discreet layer, as described hereinbelow. In a similar manner, the container lid 14 is formed from a first sheet 24 which includes either singly or in the form of a discreet layer, a first material. Lid 14 is placed above flange 16 of the container 12 and a seal head 26 having a shaped surface 28 is moveable downward into contact with the lid and container by actuation of the movement means 30 such as a controllable pneumatic cylinder 32 well known to the art.

Shaped surface 28 in a preferred embodiment, includes beveled angle Theta 1, 34 and beveled angle Theta 2, 36 in a preferred embodiment having values from 15° to 45°. Lid 14 in a preferred embodiment will have a thickness T1 38 of 0.0045 inches whereas container wall 18 will have a thickness T2, 40 of 0.030 inches.

Figure 2:
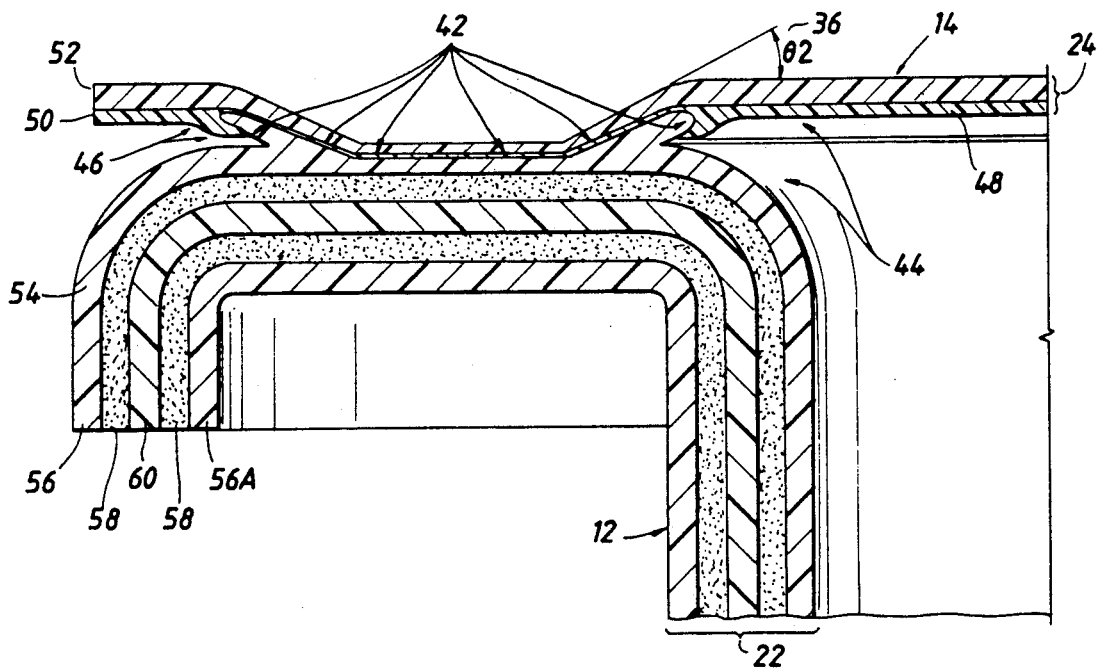
FIG. 2 shows a schematic representation in a side view in cross section of the lid sealed to the container flange.

Referring now to FIG. 2, lid 14 is shown operatively engaged to the container 12 after the seal head 26 has contracted, heated, and/or pressured portions of the lid and container. The sealed area 42 can be seen to extend from the container inside rim 44 to the container outside rim 46. Angle Theta 2, 36 can be seen to have been impressed in the lid and container structure by downward movement of the seal head 26 into contact with the upper surface of the lid.

It can be seen that the lid is now operatively engaged to the container, and more particularly, by proper selection of the operating parameters of the invention, the lid is successfully hermetically sealed to the container.

The first material 48 which comprises in a preferred embodiment a lower layer of the lid having a thickness of approximately 0.002 inches is a mixture of high density polyethylene and polyisobutylene, forming blend layer 50. The first material 48 would have a melting temperature of from about 125° to about 140° C. The top layer of the lid of the preferred embodiment would comprise a PET/PVDC/PET layer 52 as is commonly used in the top lid structures of food containers, having a thickness of approximately 0.0025 inches. Alternatively, of course, the top layer could be aluminum foil. Layers 52, 50 form the structure of the first sheet 24.

The second material 54 portion of the second sheet 22 in a preferred embodiment comprises a polypropylene layer 56 having a melting temperature of from about 165° to about 175° C. and a thickness of approximately 0.005 inches. The first material in a preferred embodiment has a lower melting temperature than the second material, though it should be well understood that various melting temperature materials may be used to practice the invention.

The remaining layers of the second sheet 22 would typically comprise an adhesive layer 58 such as functionalized polypropylene, having a thickness of 0.003 inches, an EVOH layer 60 having a thickness of 0.004 inches, followed by another adhesive layer 58 having a thickness of 0.003 inches, and finally ending with another layer of polypropylene 56A having a thickness of 0.005 inches. Regrind material layers of approximately 0.005 mils may be included in the second sheet as is well known to the art.

It should be well recognized that many other layer laminates may be used to accomplish the same interlocking wave joinder of a lid and a container.

Figure 3A:
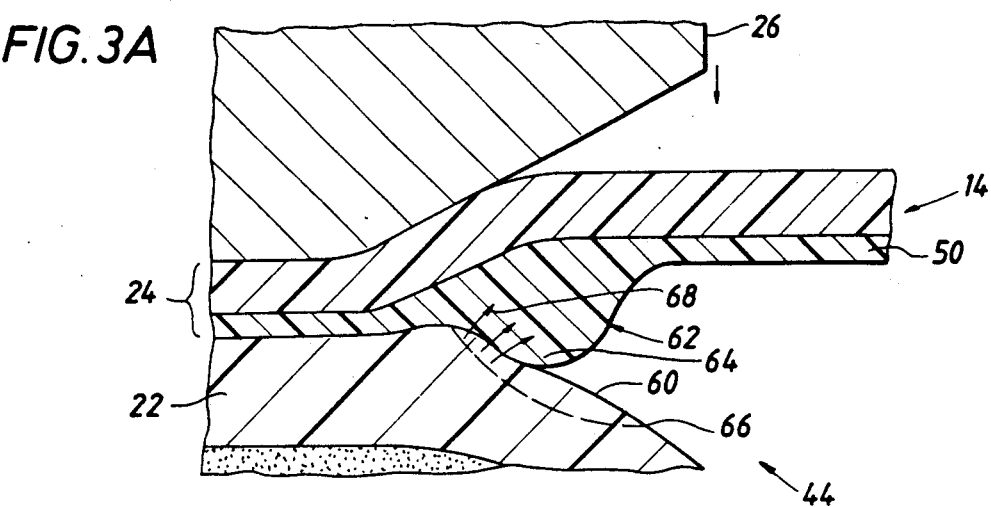
FIG. 3A shows a schematic representation in a side view in partial cross section of the lid material initially flowing from beneath the seal head contact area.
Figure 3B:
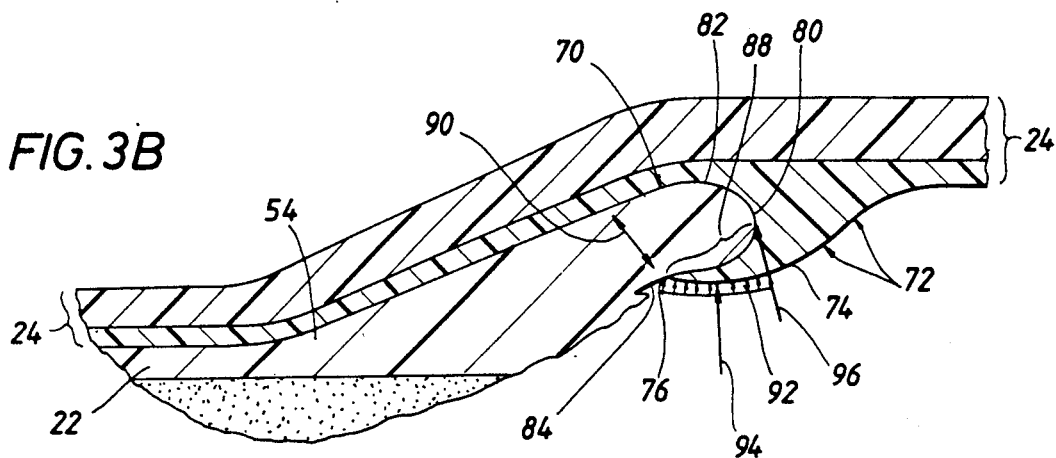
FIG. 3B shows a schematic representation in a side view in cross section of the interlocking first sheet wave and second sheet wave.
Figure 3C:
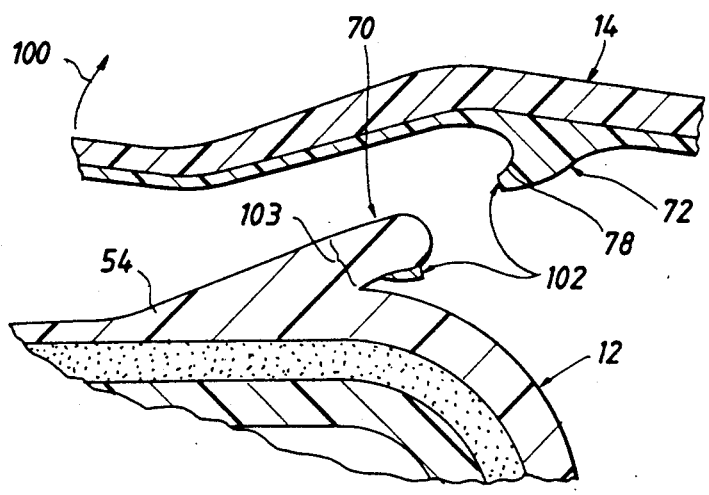
FIG. 3C shows a schematic representation in a side view in cross section showing the lid being peeled from the container.

Referring now to FIGS. 3A, 3B and 3C the method of sealing the lid to the container, as well as removal of the lid from the container is shown. Referring more specifically to FIG. 3A, the seal head 26, preferably heated to a temperature of from about 425° to about 475° F., is shown driven downward into contact with the first sheet 24 at a sufficient distance to compress the first sheet and the top surface 60 of the second sheet together. As previously mentioned, the first sheet may be heated by driving a heated surface of the seal head 26 downward into contact with the first sheet, or the first sheet may be heated by radio frequency energy as is well known to the art, prior to or during contact of the seal head with the first sheet. The second sheet 22 may also be (pre)heated by the application of RF energy, or in a preferred embodiment the second sheet is heated by thermal energy transferred from the first sheet into the second sheet, the thermal energy being delivered to the first sheet by contact of the heated seal head with the first sheet.

In operation, the heated seal head is driven downward into the first sheet 24 and supplies sufficient pressure and thermal energy, during the initiation of the lid sealing process, so as to melt the blend layer 50 to cause a portion of the layer to flow outward from underneath the contact area of the seal head so as to form a preliminary first sheet wave 62. Wave 62, for the purposes of comparison with FIG. 3B, can be seen to include the position of a preliminary first sheet wave apex 64. The thermal energy and pressure supplied by the seal head is also sufficient to begin the formation of a second sheet melted portion 66 having a preferential second sheet flow direction 68 as indicated by the arrows shown penetrating the blend layer 50 of the first material 48.

The initial step of the process can therefore be seen to include the formation of the preliminary first sheet wave 62 at the inside rim of the container. The lower side of the preliminary wave 62 due to the selection of materials in the preferred embodiment is adhesively engaged with the second sheet top surface 60 such that the flow mass of the first material displaced from beneath the seal head tends to concentrate along the container inside rim 44.

Referring now to FIG. 3B, a portion of the second sheet has been heated and/or pressured for a sufficient time to melt and/or displace a portion of the second material 54. The melted and/or displaced portion of the second sheet thereafter flows into the preliminary first sheet wave 62 (FIG. 3A) to form a second sheet wave 70, simultaneously displacing a portion of the preliminary first sheet wave below the second sheet wave 70 so as to form the first sheet wave 72, which interlocks over interlock area 88 with the second sheet wave 70 around the inside rim of the container.

The second sheet wave 70 in other words "jets" or flows upwardly into the preliminary first sheet wave 62 so as to divide the preliminary wave 62 into an upper and lower portion, the lower portion being labeled as the first sheet wave 72. This wave 72 can be seen to have a first sheet wave crest surface 74 defined along its outer periphery, and also a first sheet wave apex 76 located at the distal end of the crest surface 74, and also located at the distal end of the underside 78 (FIG. 3C) of the first sheet wave 72.

In a similar manner, the second sheet wave 70 can be seen to include a second sheet wave apex 80 located at the distal end of the second sheet wave crest surface 82 and the second sheet wave underside 84. More specifically, the waves 70, 72 can be seen to be overlapped between the first sheet wave apex and the second sheet wave apex to form the interlock area 88.

The burst pressure of the container/lid system is a function of the shear strength of the second sheet wave across lines A—A of shear couple 90, the mode of failure being shear across the second wave. The shear failure force is much higher than the peel force 100, (FIG. 3C). The distributed internal pressure 92 is represented by a series of small arrows formed normal to the first sheet wave crest surface 74. This distributed internal pressure 92 may be represented by a center of pressure arrow 94 which represents a summation of the distributed internal pressure 92 over the area of interest. It can be seen that the shear couple 90 counteracts the center of pressure arrow 94, representing in a graphical manner that the strength of the container/lid joint is enhanced by the interlocking wave design.

Figure 5:
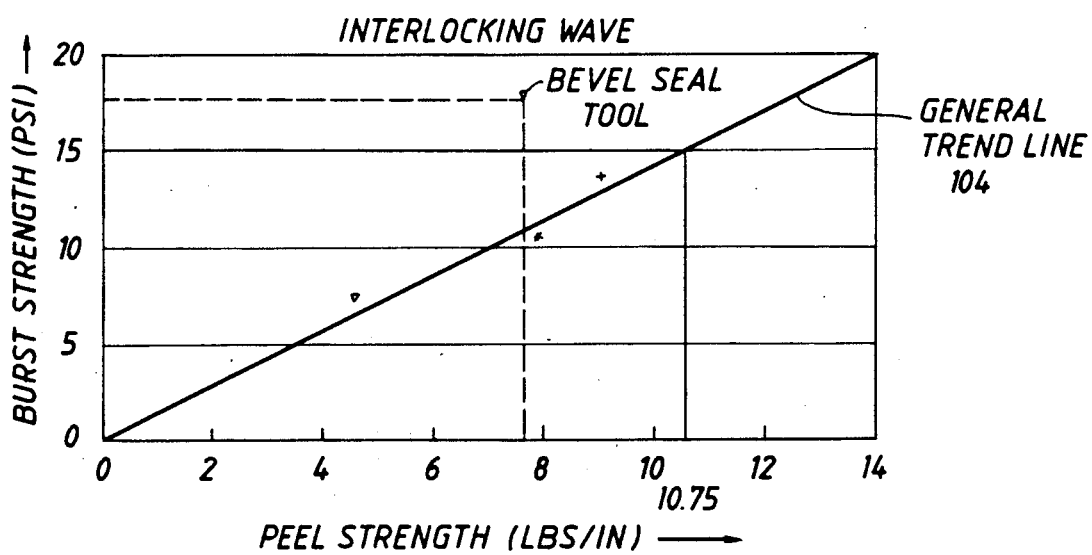
FIG. 5 shows a graphical comparison of the interlocking wave bevel seal tool burst strength versus peel strength, as compared with the burst strengths and peel strengths of commercially available heat sealed container/lid systems.

It is well known that the distributed internal pressure 92 generates hoop stresses throughout the container/lid structure, these hoop stresses being counteracted by the shear force across the material of the second wave. It can be seen therefore that the container lid junction structure, by use of the interlocking waves 70, 72 formed substantially normal to the distributed internal pressure 92, effectively resists destruction of the container/lid junction up to pressures of approximately 18 psi, (reference FIG. 5). For the purposes of graphical description, FIG. 3B also includes an apex pressure vector 96 defined normal to the first sheet wave crest surface 74 and tangentially intersecting the second sheet wave apex 80.

In a preferred embodiment therefore, the pressures and temperatures, along with the selection of the container/lid junction are selected such that after application of the heated seal head the first sheet wave apex and the second sheet wave apex are located on opposite sides of a defined center of pressure 94, the center of pressure representative of that portion of the distributed internal pressure 92 contained within the sealed lid and container applied on the first sheet wave crest surface, between the first sheet wave apex and the apex pressure vector 96. Location of the apexes 76, 80 in such a manner increases the effective interlock area 88 of the junction and reduces the magnitude of the sheer stress that parallels the undersides of the waves 70, 72.

In a preferred illustrative embodiment the seal head would be heated to 425 degrees Fahrenheit and pressed against the container flange lid structure from 1.2 to about 1.35 seconds at a constant pressure of from about 70 to about 80 psi.

It should be recognized in the practice of the present invention that the first sheet wave apex 76 should at least extend leftward of the center of pressure arrow 94, although an alternative embodiment the first sheet wave apex should at least extend leftward of the apex pressure vector 96, depending of course on the choice of material(s) and/or adhesives used for the junction.

Referring now to FIG. 3C when the consumer wishes to remove the lid from the container, a peel force indicated by arrow 100 is applied at the edge of the first sheet such that the lid is lifted upwards away from the second sheet material. It has been found in the removal of the lid from the container that a break point 102 is generated on the first sheet wave underside 78 of the first sheet wave 72.

It can therefore be envisioned that the peel forces required to remove the lid from the container need only be sufficient to overcome the adhesion of the first material from the second material from the container outside rim 46 (FIG. 2) up to break point 102, along of course with the force necessary to shear the first material at break point 102. The peel force therefore is merely required primarily to overcome adhesive resistant forces, whereas for the container to burst the internal pressure forces must cause the second sheet wave to fail in shear at lines A—A in the area of the wave root 103.

Figure 4:
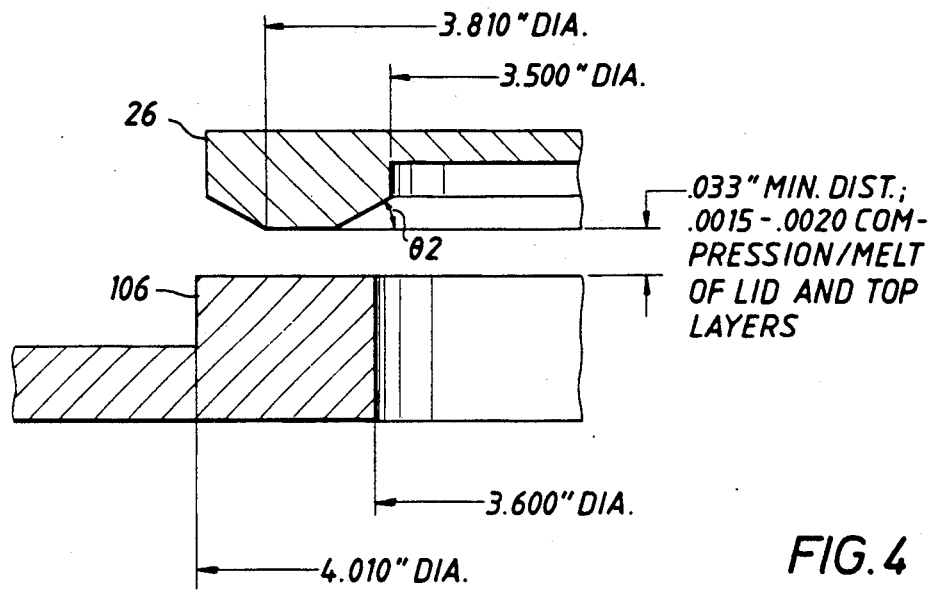
FIG. 4 shows a schematic representation in a side view in cross section of the typical dimensions of the seal head and support die.

Referring now to FIG. 4 the illustrative dimensions used in the practice of the preferred embodiment are shown for the seal head 26, as well as for the support die 106 used to support the container flange 16.

It should be noted that with the selected total thicknesses T1 38 and T2 40 (FIG. 1) of the lid and container flange of 0.0345 inches, and with the seal head 26 driven within approximately 0.033 inches of the support die, that approximately 0.0015 to 0.0020 inch compression and/or melt of the lid and top layers occurs to effectuate the practice of the invention.

Burst strength and peel strength test results of the container of the preferred embodiment (graphically represented in FIG. 5), show that the peel strength is less than 8 lbs/inch, whereas the burst strength is 18 lbs/sq. inch. By practice of the invention therefore a container/lid sealing method and structure may be generated that have clearly superior burst and peel strengths than those indicated by the general trend line 104 in FIG. 5.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention. It should be well understood that many other material selections, as well as operating pressures and temperatures may be used and selected to achieve the "interlocking wave" teachings of the present invention.

I claim as my invention:

1. A method of forming a peelable seal between a lid and a container, said method comprising:
   heating a first material forming a portion of said lid along an area to be sealed so as to melt or soften a portion of said first material, said area placed in contact with a second material forming a portion of said container,
   pressing said first material and said second material together along said area to be sealed forming a first sheet wave in said first material having a first sheet wave apex and forming a second sheet wave in said second material having a second sheet wave apex, and
   maintaining pressure on said first material and said second material along said area to be sealed so as to displace said first sheet wave apex below said second sheet wave apex, said second material remaining with said container when said lid is peeled from said container.

2. A method as claimed in claim 1, wherein the first material is a blend of high density polyethylene and polyisobutylene.

3. A method as claimed in claim 1 wherein the second material is polypropylene.

4. A method of forming a peelable seal between a lid and a container, said method comprising:
   heating a first material forming a portion of said lid along an area to be sealed so as to melt or soften a portion of said first material, said area placed in close and intimate contact with a second material forming a portion of said container,
   pressing said first material and said second material together along said area to be sealed, so as to form a first sheet wave in said first material having a first sheet wave apex and a second sheet wave in said second material having a second sheet wave apex, and
   maintaining pressure on said first material and said second material along said area to be sealed so as to displace said first sheet wave apex below said second sheet wave apex, an interlock area being formed therebetween, a portion of said interlock area forming a portion of said peelable seal, said second material remaining with said container when said lid is peeled from said container.

5. A method of joining a lid to a container which comprises:
   heating along an area to be sealed a first material portion of a first sheet forming said lid, while said first sheet is in direct and intimate contact along said area to be sealed with a second material portion of a second sheet, said second sheet forming a flange about the upper periphery of said container, said first material having a lower melting temperature than said second material, said heating being carried out for a time and temperature sufficient to melt or soften a portion of said first material;
   applying pressure to said first sheet and said second sheet along said area to be sealed so as to form at the inside rim of said container a preliminary first sheet wave,
   heating a portion of said second sheet sufficiently to melt or soften a portion of said second material,
   flowing said melted or softened portion of said second sheet into said preliminary first sheet wave to form a second sheet wave, and
   displacing a portion of said preliminary first sheet wave below said second sheet wave so as to form interlocking waves of said first material and said second material at least around the inside rim of said container said second material of said second sheet wave remaining with said container when said lid is lifted upwards away from said second sheet material.

6. The method of claim 5 wherein the step of heating said second sheet includes the step of:
   driving a heated shaped surface of a seal head downward into contact with said first sheet for a period sufficient to transfer thermal energy through said first sheet into said second sheet.

* * * * *